United States Patent
Bartkowiak (10) Patent No.: US 6,711,540 B1
(45) Date of Patent: Mar. 23, 2004

(54) TONE DETECTOR WITH NOISE DETECTION AND DYNAMIC THRESHOLDING FOR ROBUST PERFORMANCE

(75) Inventor: John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/160,415

(22) Filed: Sep. 25, 1998

(51) Int. Cl.$^7$ ............................................... G10L 21/02
(52) U.S. Cl. ........................................ 704/226; 704/229
(58) Field of Search ................................. 704/226, 227, 704/230

(56) References Cited

U.S. PATENT DOCUMENTS

| | | | | |
|---|---|---|---|---|
| 4,689,760 A | * | 8/1987 | Lee et al. .................... | 370/526 |
| 5,253,326 A | * | 10/1993 | Yong .......................... | 704/200 |
| 5,307,441 A | * | 4/1994 | Tzeng ......................... | 704/222 |
| 5,450,490 A | * | 9/1995 | Jensen et al. ................ | 380/253 |
| 5,485,522 A | * | 1/1996 | Solve et al. .................. | 381/56 |
| 5,727,072 A | * | 3/1998 | Raman ...................... | 381/94.2 |
| 5,764,763 A | * | 6/1998 | Jensen et al. ................ | 380/253 |
| 5,774,849 A | * | 6/1998 | Benyassine et al. | |
| 5,819,217 A | * | 10/1998 | Raman ....................... | 704/233 |
| 5,911,128 A | * | 6/1999 | DeJaco ....................... | 704/221 |
| 5,953,696 A | * | 9/1999 | Nishiguchi et al. ......... | 704/209 |
| 5,974,373 A | * | 10/1999 | Chan et al. .................. | 704/200 |
| 6,229,889 B1 | * | 5/2001 | Cannon et al. .............. | 379/386 |

OTHER PUBLICATIONS

Oppenheim et al, "Discrete Time Signal Processing", Prentice Hall Signal Processing Series, pp. 585–587, 1989.*
U.S. App. No. 09/160,417, filed Sep. 25, 1998, entitled "Efficient Dynamic Energy Thresholding In Multiple–Tone Multiple Frequency Detectors," naming John G. Bartkowiak, inventor, 32 pp.

* cited by examiner

Primary Examiner—Doris H. To
Assistant Examiner—Michael N-Opsasnick
(74) Attorney, Agent, or Firm—Zagorin, O'Brien & Graham, LLP (57) ABSTRACT

An apparatus for detecting at least one tone having a known frequency and duration in an input signal. The input signal is input over a period of time which is divided into frame portions including at least an initial frame portion and a last frame portion. An energy signal indicative of the energy of the input signal during each frame portion is generated. A signal filter receives the energy signal and generates a noise indicator for each frame portion based on whether noise is detected in the energy signal. A dynamic threshold determiner generates an energy threshold for each frame portion. The energy threshold for the initial frame portion is generated based on a minimum expected value of the energy signal for a subsequent frame portion. The energy thresholds for frame portions subsequent to the initial frame portion are generated based on values of the energy signals during previous frame portions and the noise indicator. A signal processor determines when the input signal includes the at least one tone based on the energy threshold, the noise indicator, and the energy signal.

13 Claims, 7 Drawing Sheets

TONE DETECTOR WITH NOISE DETECTION AND DYNAMIC THRESHOLDING FOR ROBUST PERFORMANCE

BACKGROUND OF THE INVENTION

1. Field of the Invention

This invention relates to communication systems, and more particularly, to a method and apparatus to detect tones in a noisy signal environment using noise detection and dynamic thresholding.

2. Description of the Related Art

Communication systems often utilize a loop to connect terminal equipment such as telephone instruments, facsimile machines, private branch exchanges, key telephone systems, voice mail systems, modems, computers, alarm systems, radio controlled systems and telephone answering machines as well as many other devices. These devices are often referred to as Customer Premises Equipment ("CPE"). To perform various signaling applications such as telephone dialing, data entry, caller ID, and storage system control, Dual-Tone Multiple Frequency ("DTMF") signals are often used. A DTMF signal is defined by two superimposed sinusoidal waveforms with frequencies generally chosen within the voice band.

Detection of multiple-tone, multiple frequency (MTMF) signals, such as Dual-Tone Multiple Frequency (DTMF) signals in environments where one or more noise signals is present is generally recognized by those of ordinary skill in the art to be a complex issue. Detection of MTMF signals is particularly difficult when the noise signals share the voiceband used for inband MTMF signaling. One source of noise interference which impedes MTMF detection is referred to as "talk-off". Talk-off occurs whenever a signal tone detector erroneously accepts signal imitations, such as those produced by speech or music, as valid signals. These noise signals can imitate some of the temporal and spectral characteristics of signaling tones. These imitations are likely to trigger, or talk-off, signal tone detectors. An important goal in designing such detectors is making them immune to these signal imitations.

An additional problem with signal tone recognition is that signaling tones must, in some situations, compete with speech, music or other extraneous background noise. The existence of these complex noise signals introduces spectral components into the signal to be recognised that distort and ultimately impair the detection of valid signaling tones. A signal detector is said to have been "talked down" whenever it fails to recognize valid signaling tones that were masked by noise signals such as speech, music or other noise.

SUMMARY OF THE INVENTION

One embodiment of the present invention pertains to an apparatus for detecting at least one tone having a known frequency and duration in an input signal. The input signal is input over a period of time which is divided into frame portions including at least an initial frame portion and a last frame portion. An energy signal indicative of the energy of the input signal during each frame portion is generated. A signal filter receives the energy signal and generates a noise indicator for each frame portion based on whether noise is detected in the energy signal. A dynamic threshold determiner generates an energy threshold for each frame portion. The energy threshold for the initial frame portion is generated based on a minimum expected value of the energy signal for a subsequent frame portion. The energy thresholds for frame portions subsequent to the initial frame portion are generated based on values of the energy signals during previous frame portions and the noise indicator. A signal processor determines when the input signal includes the at least one tone based on the energy threshold, the noise indicator, and the energy signal.

In the present invention, the input signal may be an analog signal that is converted to the frequency domain. The energy signal of the input signal is generated using a discrete Fourier transform, such as the Goertzel algorithm. The signal filter separates a portion of the energy signal associated with the at least one tone from a remaining portion of the energy signal, and sets the noise indicator based on the remaining portion of the input energy signal being above a noise threshold. A variety of signal filters may be utilized in the present invention, however a preferred embodiment of the signal filter includes a low pass filter for separating the portion of the energy signal associated with the at least one tone from the remaining portion of the energy signal, a signal averaging filter for determining an average value of the remaining portion of the energy signal, and a peak detector for determining the maximum average value.

The signal processor compares the energy levels for the at least one tone between at least two frame portions to determine whether the at least one tone is detected. The signal processor may allow at least one dropout in energy level in a corresponding frame portion to improve the present invention's tone detection. A dropout occurs when the energy for the entire frame portion is below a threshold, or when a linearly increasing energy count for a portion of a frame portion falls below a count threshold. The signal processor also determines when the energy levels of the at least one tone are within a predetermined range between at least two frames. Further, the signal processor may normalize the energy levels between the at least two frames based on the number of samples in each of the at least two frames before comparing the energy levels.

A further embodiment of the present invention is a method for detecting at least one tone having a known frequency and duration in an input signal, wherein the input signal may include a plurality of tones and noise. The method includes determining at least an initial frame portion and a last frame portion based at least partially on the frequency and duration of the at least one tone, determining an initial energy threshold detection level for the initial frame portion, and determining an energy value indicative of the energy of the input signal for the initial frame portion. The initial energy threshold detection level is based on a minimum expected energy level. The method further includes determining energy threshold detection levels for frame portions subsequent to the initial frame portion based on the energy value of previous frame portions and whether noise is detected in the input signal. The energy values between subsequent frame portions and selected previous frame portions are compared to determine if the at least one tone is present in the input signal. The method proceeds for subsequent frame portions until the energy value for the last frame portion is compared to the energy value for a previous frame portion.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present method and apparatus provides improved talk-off and talk-down performance and, in consequence, more robust tone detection in situations where extraneous signals such as speech or noise share the frequency range used for inband tone signaling. The present invention may be applied in a variety of situations including telephony to enhance detection of inband signals.

Figure 1:
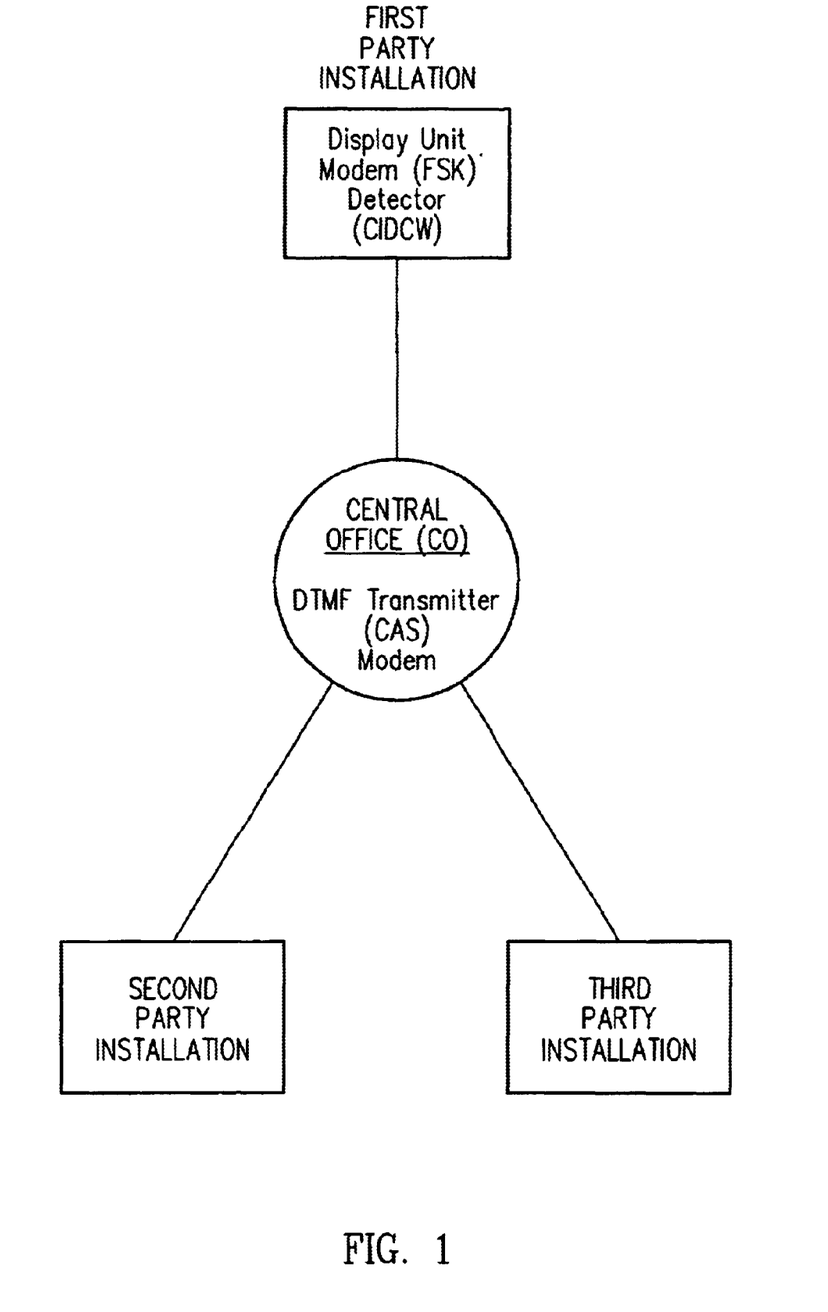
FIG. 1 is a block diagram of an example of an application wherein the present invention may be utilized.

For example, the present invention may be applied to a group of telephony services known as Caller Identity Deliver on Call Waiting (CIDCW), which requires reliable signal detection in an adverse signaling environment. A typical installation for CIDCW is shown in FIG. 1. The CIDCW service provides caller identification information to the subscriber for calls that arrive while the subscriber is using the equipment. In a typical situation, a first party and a second party have a connection established between them. The first party subscribes to CIDCW. Call waiting gives the first party the option of answering the incoming call while putting the second party on hold, or answering the incoming call after terminating the connection with the second party. When a third party attempts to call the first party, the third party receives audible ringing upon completion of dialing the first party's number. A Central Office (CO) switch recognizes that the call is destined for the first party and executes the CIDCW service routine. The CO switch splits the connection and, consequently, mutes the second party. The CO sends the regular call waiting signal, a 440 Hz tone of approximately 300 milliseconds duration, to the first party and it appends a short burst of a special alerting signal, the Customer Premises Equipment Alerting Signal (CAS), to the call waiting signal to prompt the first party's equipment. The equipment must reliably detect this alerting signal so that the subscriber's handset and any other parallel extension handset is muted upon receiving the signal. An acknowledgment signal is sent back to the CO, and the first party's equipment places a frequency-shift keying (FSK) data receiver, such as a modem, on the line awaiting the caller identification information. The first party's equipment then receives the data, decodes the information, and displays it for the subscriber to view. The connection between the first and second party is then re-established once data transmission is complete.

The reliability of CIDCW service depends on the accuracy with which the alerting signal is detected by the subscriber's equipment. Since a DTMF signaling scheme was chosen for this service, the problem of talk-off and talk-down may cause the following problems:

1. If the subscriber's detector incorrectly accepts a noise signal, such as signal imitation produced by speech (talk-off), the Customer Premises Equipment (CPE) will interrupt the connection by muting the handset and any extension handsets, and will send back an acknowledgment signal at a relatively high amplitude in comparison to what the subscriber normally hears on the line. The connection between the first and second parties remains interrupted until the CPE times out waiting for data from the CO. Since the CO did not originate the alerting signal, and therefore did not split the connection between the first and second parties or mute the second party, the second party will unintentionally receive the acknowledgment signal at an undesirable listening level.

2. Alternatively, if the CPE is talked-down and fails to recognize an alerting signal sent by the CO, no caller identification information will be delivered and the service paid for by the subscriber will not be rendered.

In both cases, detector failure degrades the quality of the service.

Since both talk-off and talk-down have negative consequences, it is desired to minimize such occurrences. Also, the alerting signal can be sent at any time while the first and second parties are connected, and the CAS detector must therefore remain on the line for the entire duration of the call. During this time, the detector is constantly exposed to noise signals including speech with the consequent possibility of talk-off. Since talk-off degrades the voice signals, repeated talk-offs in relatively short time periods should be avoided.

Figure 2:
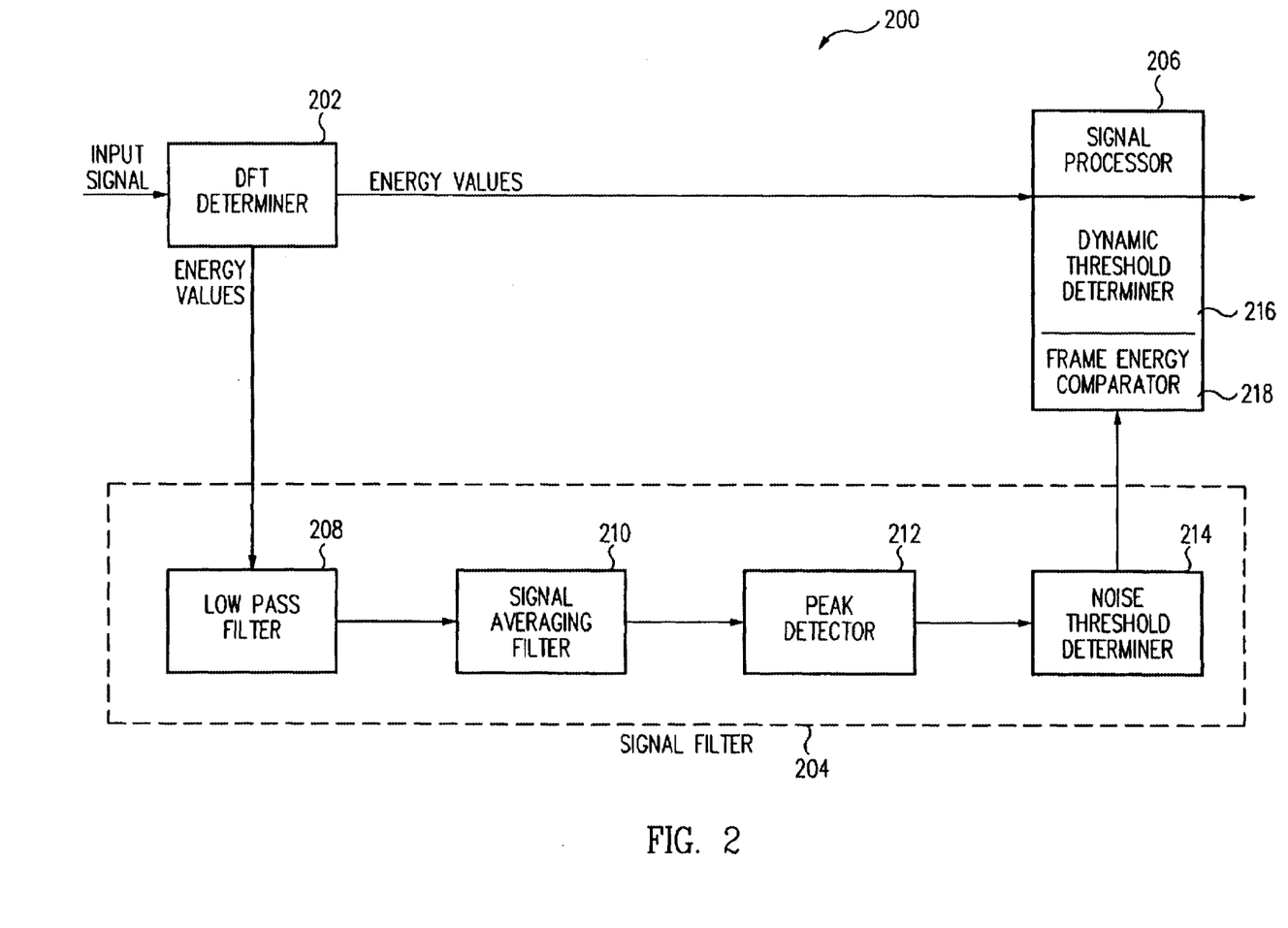
FIG. 2 is a block diagram of components included in the present invention.

FIG. 2 is a block diagram of components included in the present invention for a signal tone detector 200 for detecting multiple-tone, multiple frequency signals, such as DTMF signals, including DFT determiner 202, signal filter 204, and signal processor 206. Signal tone detector 200 is connected into the subscriber's equipment, for instance within a handheld portable telephone, or within the base unit of a non-portable telephone. The present invention will now be described by application of these components to the CIDCW example. A DTMF frequency combination of 2130 Hz and 2750 Hz for the CAS signal is used. Examples of acceptable parameter limits are:

Lower Tone: 2130 Hz+/−0.5%

Upper Tone: 2750 Hz+/−0.5%

Dynamic Range: −14 to −32 decibel milliwatts (dBm) per tone

Power Differential within Dynamic range: 0 to 6 decibels (dB) between tones

Signal duration at Customer Premises Equipment: 75 to 85 ms.

It is recognized that other applications utilizing the present invention may include different components having different functionality, different frequencies, and different parameter limits. The values being used to illustrate the CIDCW example are not meant to limit the present invention to a particular application, number of frequencies, set of frequencies, or set of parameters. It is also recognized that the present invention may be applicable to decode signals containing more than two tones.

DFT Determiner

Detecting the CAS signal involves extracting two tones in the DTMF signal and determining that their duration is within the specified limits, with or without the presence of noise signals. The tones typically begin within one millisecond of one another and end within one millisecond of one another. The present signal tone detector 200 uses DFT determiner 202 to transform the input time-domain signal into its frequency-domain equivalent by means of the discrete Fourier transform (DFT). There are several known methods for generating the DFT of a signal that may be applied to the present invention. One method is known as the Goertzel algorithm, which is described in numerous publications on signal processing including "Introduction To Digital Signal Processing", J. G. Proakis, D. G. Manolakis, MacMillan Publishing. It is recognized that other known Fourier transform algorithms may be used in DFT determiner 202.

The Goertzel algorithm is utilized in an embodiment of the present invention as will now be described. The Goertzel algorithm is a second-order recursive computation of the DFT using both a feedback and a feedforward phase. The feedback phase computes a new output y(n+1) for every new input sample x(n) where N is the number of input samples. The feedback equation is:

$$y(n+1)=c*y(n)-y(n-1)+x(n)$$
$$c=2*\cos(2*pi*f/F) \quad (1)$$

where
 c is the Goertzel coefficient;
 f is the frequency to be detected; and
 F is the sampling frequency.

The feedforward phase is normally only calculated when n=N generating a single output energy parameter using the equation:

$$|Yk(N)|^2=y(n)*y(n)+y(n-1)*y(n-1)-2*c*y(n)*y(n-1)$$

where $$c=2*\cos(2*pi*k/N)=2*\cos(2*pi*f/F) \quad (2)$$

In the Goertzel algorithm, determining the coefficient c for a given tone frequency requires a trade-off between accuracy and speed of detection. These parameters depend on the value of N. If N is large, resolution in the frequency domain is good, but the time to generate the output from the feedforward phase increases. This is because N samples are processed in the feedback phase before the output from the feedforward phase can be calculated.

In selecting a value for k, it is recognized that the spacing of the energy output values in the frequency domain from the feedforward phase is equal to half the sampling frequency F divided by N. Therefore, if some tone is present in the input signal which does not fall exactly on one of these frequency points, the energy of this frequency component appears mostly in the closest frequency point but partly in the other frequency points. This phenomenon is known as leakage. In order to avoid leakage, it is desirable for the tones requiring detection to be centered exactly on a frequency point. These discrete frequency points are referred to by the k value in the equation (2) above. This value is an integer value lying in the range (0,1, . . . , N−1) where the actual frequency to which k corresponds depends on the sampling frequency F and N using the formula:

$$\frac{f(\text{tone})}{F(\text{sampling})} = \frac{k}{N} \quad (3)$$

Therefore, $$k = \frac{N}{F(\text{sampling})} * f(\text{tone}) \quad (4)$$

where f(tone) is the frequency to be detected and k is an integer.

The sampling frequency F used in a telephone network is approximately 8 KHz, leaving only the variable N that can be modified. Since the k values are integers, the corresponding frequency points may not be exactly aligned with the tones required to be detected. The k values will therefore have a corresponding absolute error e(k) associated with them defined as the difference between the real number k and the closest integer to this real value. This is shown in the following equation:

$$\text{absolute error } e(k) = \left| \frac{N*f(\text{tone})}{F(\text{sampling})} - \text{closest integer} \frac{N*f(\text{tone})}{F(\text{sampling})} \right| \quad (5)$$

Using equation (5), the values of N best suited to the CAS tones of 2130 Hz and 2750 Hz are determined using the duration of the tone and the sampling frequency. In the present example, the CAS tone duration is 75–85 milliseconds, which is equivalent to 600–680 samples at the 8 kHz sampling frequency. A frame detection length of approximately 150 to 170 samples allow the detection algorithm to perform detection on four consecutive frame portions of the tones present in the input signal. The number of frame portions will vary depending on the sampling frequency and the duration of the tone. One embodiment includes four frame portions, also referred to as frames, however other embodiments having at least two frames, including an initial frame portion and a last frame portion, may be utilized. Using the CAS tone duration, the analysis results in the values for N as shown in Table 1 being chosen for the two CAS tones:

TABLE 1

| f (tone) | N value | k value (float) | k value (integer) | absolute error e (k) | Goertzel coefficient (c) |
|---|---|---|---|---|---|
| 2130.0 | 169 | 44.99625 | 45 | 0.00375 | −0.204126297 |
| 2750.0 | 160 | 55.0 | 55 | 0.00 | −1.111140466 |

Signal Filter

Once the DFT for the input signals is determined using a suitable method, such as the Goertzel Algorithm described hereinabove, signal tone detector 200 filters the signals using signal filter 204 to determine the presence of noise in the input signal. Various signal filters may be utilized in the present invention, with signal filter 204 being provided as one example. An embodiment of signal filter 204 includes low-pass filter 208 cascaded with signal averaging filter 210, peak detector 212, and noise threshold determiner 214. Low-pass filter 208 is of the form:

$$y(n)=b2*x(n-2)+b1*x(n-1)+b0*x(n)-a1*y(n-1)-a2*y(n-2) \quad (6)$$

where b2, b1, b0, a1, and a2 are constants having values that are determined based on the frequencies of the signals that should be passed to an output signal and the frequencies of the signals that should be blocked, or filtered out, as known in the art. In the CIDCW example, low pass filter 208 filters out at least a portion of the CAS tones from the input signal while retaining most of the extraneous noise, consisting of speech in this example, in the output signal.

Signal averaging filter 210 is of the form:

$$sigav(n)=c1*sigav(n-1)+c0*abs(y(n)) \quad (7)$$

where:

y(n) is the output from the low-pass filter;

c1+c0=1; and abs(y(n)) is the absolute value of the output from the low-pass filter.

Figure 2A:
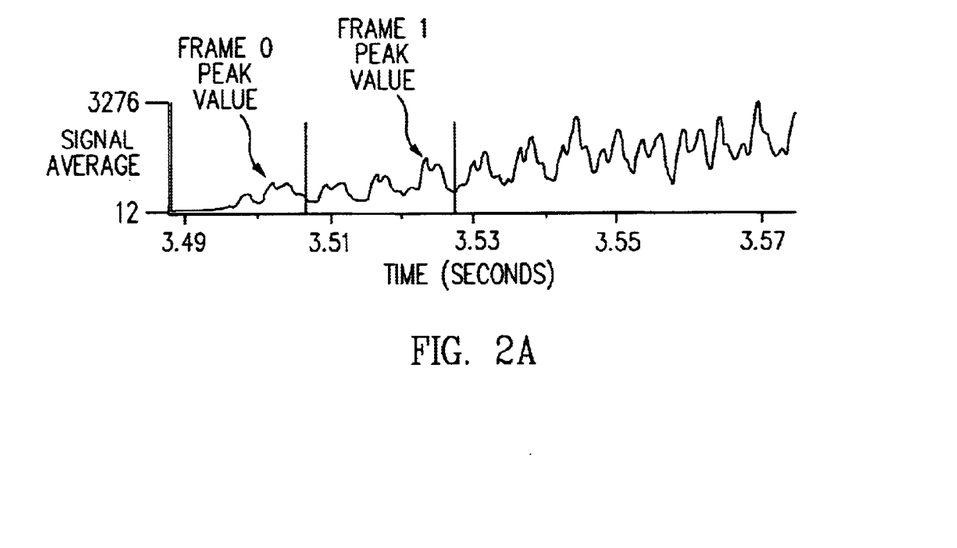
FIG. 2A is a time history graph showing the output from a signal averaging filter.

Peak detector 212 retains the largest absolute value output by the signal averaging filter 210 during the frame of 169 samples selected for this example. Noise threshold determiner 214 determines if the peak value is greater than a lower threshold for a particular frame and sets a noise indicator signal for that frame, to indicate the presence of a noise signal. Signal filter 204 is reset at the beginning of every frame to allow individual frames to be categorized as to whether they contain noise signals such as speech. FIG. 2A is an example of the output from signal averaging filter 210 during the presence of speech. The peak value for every frame portion of 169 samples, where the frame portions are labeled frame 0 through frame 3, is used in noise threshold determiner 214. It is recognized that other filtering schemes may be utilized in signal filter 204 instead of, or in addition to, the low pass filter 208, signal averaging filter 210, peak detector 212, and noise threshold determiner 214.

Signal Processor

Figure 3A:
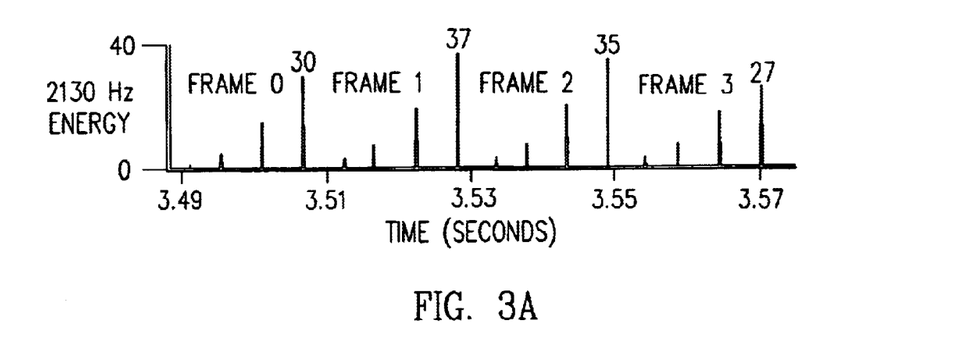
FIG. 3A is a time history graph showing example values of signal energy without noise.
Figure 3B:
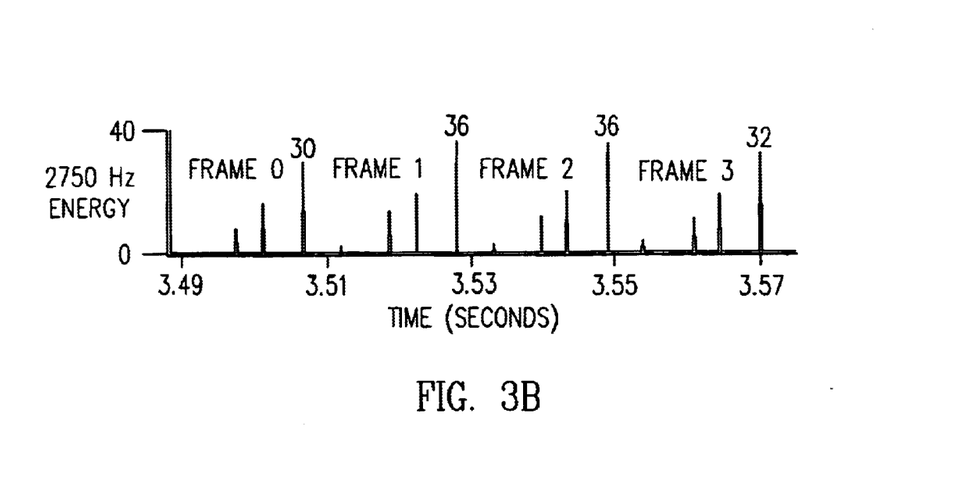
FIG. 3B is a time history graph showing example values of signal energy without noise.

During tone detection, if noise is not present in the input signal, the energy signal output from DFT determiner 202 for the tones will have similar energy values between frames. An example of detection of two CAS tones is shown in FIGS. 3A and 3B. In signal processor 206, the energy of the signals may be calculated at intermediate portions of the frame in addition to a final energy calculation done at the end of the frame. Various known methods for computing the energy of the signals may be utilized. An embodiment of the present invention utilizes an energy determination method in which an analog signal is received and a stream of data samples is created from the received analog signal. Based on the stream of data samples, a duration is calculated for one or more analog frequencies contained within the received analog signal. The duration is calculated for the one or more frequencies by utilizing a calculated signal energy for each of the one or more analog frequencies. The calculated signal energies for each of the one or more analog frequencies are used to determine a number of frequency-specific data samples. The number of frequency-specific data samples are then utilized with a sampling rate to calculate the duration of the each of the one or more analog frequencies. The one or more calculated durations of each of the one or more analog frequencies are utilized to determine whether the analog signal, composed of the one or more analog frequencies of defined duration, is present.

In the CIDCW example, the input signal to the detector 200 is a CAS tone at −32 dBm with a duration of 80 milliseconds, or 640 samples at 8 KHz sampling rate. Detector 200 includes band pass filters (not shown) for generating energy signals of the tones that are to be detected, such as the CAS tones at 2130 Hz and 2750 Hz in the CIDCW example. Such band pass filters are well known in the art. Note that, although the final energy for the 2750 Hz tone is determined at sample count 160, it is displayed in FIG. 3B at sample count 169 for consistency with the 2130 Hz final energy signal displayed in FIG. 3A. Since the 2750 Hz tone uses less samples to calculate the final frame energy, a normalization of this final energy value is required so that energy comparisons for the 2130 and the 2750 Hz tone are meaningful. This is achieved by multiplying the final 2750 frame energy by the factor:

$$(169/160)^2=1.115664063$$

Energy signals from input signals containing two or more tones to be detected may be similarly normalized in other applications of the present invention using a normalizing frequency that is appropriate for the frequencies of the particular tones involved.

For a well-conditioned signal, with no noise signal present, such as interfering speech, the final energy values for each of the two tones are consistent frame-to-frame as shown in Table 2 below. Note that the final energy values for frames 0 and 3 are slightly lower than for frames 1 and 2. This is because the number of tone samples in the starting and ending frame are less than 169 i.e. they are partial frames because the tone was detected after the start of frame 0 and completed before the end of frame 3. Therefore, the energy content for frames 0 and 3 is proportionally lower.

TABLE 2

| Frame # | 2130 Hz energy | 2130 next frame energy threshold | 2750 Hz energy | 2750 next frame energy threshold |
|---|---|---|---|---|
| 0 | 30 | 9 | 30 | 9 |
| 1 | 37 | 26 | 36 | 26 |
| 2 | 35 | 31 | 36 | 31 |
| 3 | 27 | 27 | 32 | 10 |

In the particular example shown in FIGS. 3A and 3B, selecting an initial threshold detection value for initial frame 0 is based on the lowest possible signal level signal tone detector 200 must deal with since the signal level is, at this time, unknown. However subsequent frames 1 through 3 can employ energy detection levels from previous frames to set minimum energy threshold levels. Table 2 above shows the threshold levels chosen for two CAS tones. They are derived using the following method, which is for the 2130 Hz tone. The same method is applied for the 2750 Hz tone. The scaling coefficients were determined experimentally for this particular application and may vary when the present invention is utilized in other applications depending on system signal conditions.

Frame 0: since the incoming tone energy is unknown, set the level to a threshold value which approximates the energy present in half of a frame for the lowest tone energy that the system is designed to detect. In this case, the lowest signal level is set at −32 dBm which, as listed in Table 2 above for frames 1 and 2, gives peak detector 112 output of approximately 36.

Further, frames 1 and 2 are always guaranteed to be frames containing 169 tone samples and are, therefore, not partial frames.

$$\text{Frame 0 threshold } (85/169)^2*36=9$$

Frame 1: for frame 1, take the energy measured in frame 0 and set the threshold at 85% of this value, i.e.

$$\text{Frame 1 threshold}=0.85*30=26$$

Frame 2: for frame 2, take the energy measured in frame 1 and set the threshold at 85% of this value, i.e.

Frame 2 threshold=0.85*37=31

Frame 3: since this frame could be a partial frame, set the level assuming the CAS tone has the shortest duration of 600 samples (equivalent to 75 milliseconds at 8 Khz). Also assume that the start of the tone was exactly aligned with the the beginning of the analysis frame. Thus, frame 3 could contain (600−3*169)=93 samples or more dependent on whether frame 0 was a partial frame. The scaling coefficient would then be $$(93/169)^2 = 0.3028$$

Set the level at 90% of this value to give a final scaling coefficient of 0.9*0.3028=0.2725

Frame 3 threshold=0.2725*35=10

Figure 4A:
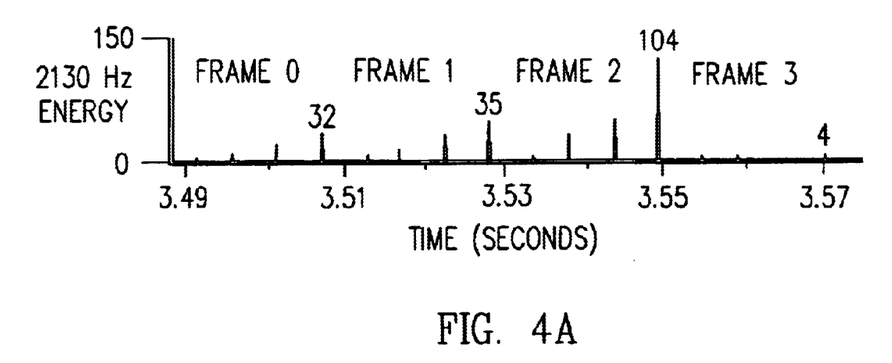
FIG. 4A is a time history graph showing example values of signal energy with noise.
Figure 4B:
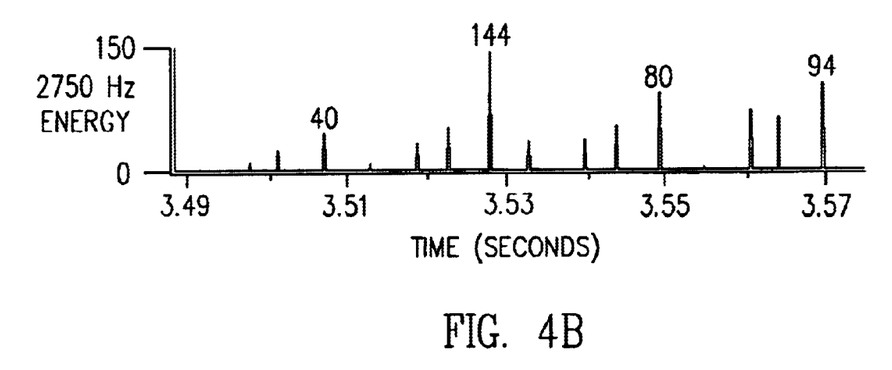
FIG. 4B is a time history graph showing example values of signal energy with noise.

This method is adequate for a well-conditioned signal, but a more sophisticated method for determining energy thresholds is used if the noise signal interferes with the detection process. For the CAS example, the CAS tone level is −32 dBm with a duration of 80 milliseconds. FIGS. 4A and 4B, and Table 3 show the final energy values output by peak detector 212 when noise such as shown in FIG. 2A is present. In this example, frame 0 is hardly affected since the noise level is still low. These energy values are similar to those tabulated in Table 2 for the noise-free case. However, in frames 1, 2, and 3 of FIGS. 4A and 4B, where the noise levels are much higher, the energy values have been affected in different ways.

In frame 1, the 2750 Hz tone energy is much greater than that detected in the noise-free case shown in Table 2. This is because the noise component of the input signal contains energy at the same frequency which is in phase with the CAS 2750 Hz tone. In frame 2, the equivalent effect has occurred in both the 2130 and 2750 Hz tones with in-phase energy from the noise component of the input signal at those frequencies boosting the energy content of peak detector 210. In frame 3, the 2130 Hz tone energy has suffered a "dropout". This may occur when out-of-phase energy at that frequency being present in the input noise cancels the energy from the 2130 Hz tone. In contrast, the 2750 Hz energy has again been boosted by the presence of the noise signal being in-phase with that frequency.

TABLE 3

| Frame # | 2130 Hz energy | 2750 Hz energy |
|---|---|---|
| 0 | 32 | 40 |
| 1 | 35 | 144 |
| 2 | 109 | 80 |
| 3 | 4 | 94 |

If the method of thresholding employed for the noise-free case were used in this example with noise present in the input signal, the results shown in Table 4 would occur.

This results in a 2750 Hz tone energy dropout in frame 2 (80 is less than 122) and a 2130 Hz energy dropout in frame 3 (4 is less than 30). If the rules for detection are relaxed, in the presence of noise signals, to allow a single energy dropout to occur during the four frame detection process, a talk-down failure still occurs because two energy dropouts have occurred in the four frame detection.

TABLE 4

| Frame # | 2130 Hz energy | 2130 next frame energy threshold | 2750 Hz energy | 2750 next frame energy threshold |
|---|---|---|---|---|
| 0 | 32 | 9 | 40 | 9 |
| 1 | 35 | 26 | 144 | 34 |
| 2 | 109 | 31 | 80 | 122 |
| 3 | 4 | 30 | 94 | 22 |

Signal processor 206 includes dynamic threshold determiner 216 and frame energy comparator 218. Dynamic threshold determiner 216 generates an energy threshold detection value for each frame based on whether there is noise in the input signal and whether a dropout occured in the frame immediately preceeding the current frame. Frame energy comparator 218 checks an energy value for the current frame against the energy value in a previous frame for an "in-range" condition. FIGS. 5 through 8 outline the operation of dynamic threshold determiner 216 and frame energy comparator 218 for respective frame portions 0 through 3 for the CAS example. It is important to note, however, that the principles used in these figures may be modified accordingly to detect tones having different frequencies, durations, and energy levels, and in situations involving a different number of frame portions.

Figure 5:
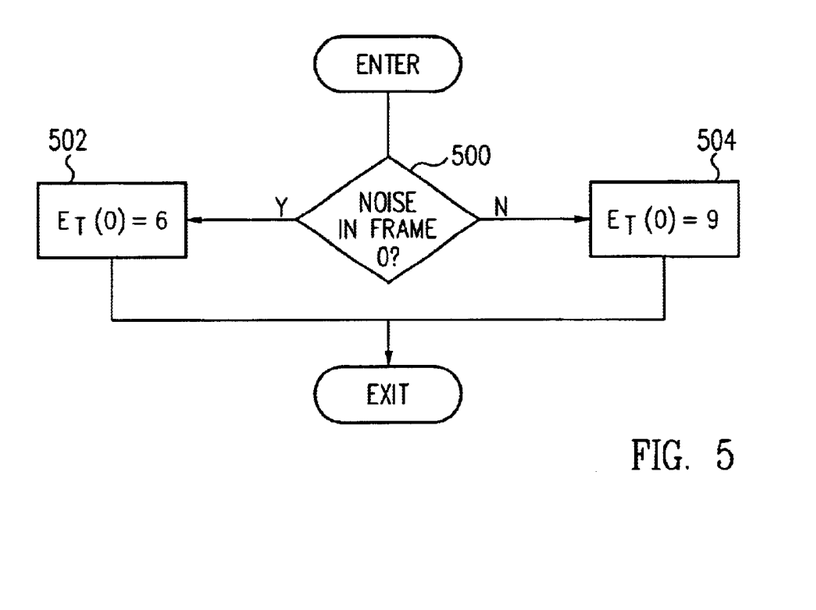
FIG. 5 is a flowchart diagram for determining a dynamic energy threshold for an initial frame.

FIG. 5 shows in a flowchart an example of determining the energy threshold detection level for the initial frame, frame 0. In block 500, a check is made to determine whether the noise indicator is set to a value indicating that noise is present in the input signal for this frame. If so, the energy threshold is set to a constant value based on an expected energy level. In this example, the value of 6 is used in block 502. If no noise is detected in the input signal, the threshold energy value is set to a constant value in 504 based on another expected energy level, such as 9 in this example. No comparison is made in this portion since frame 0 is the initial frame being processed. The energy value for frame 0 (E(0)) is determined in another portion of signal processor 206.

Figure 6:
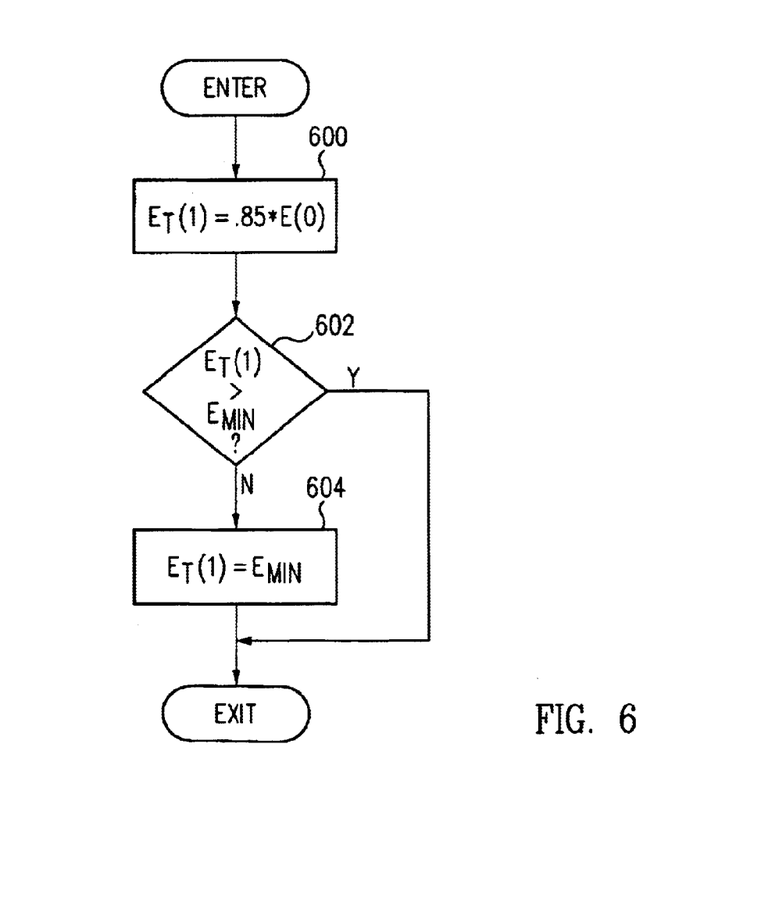
FIG. 6 is a flowchart diagram for determining a dynamic energy threshold for a second frame.

FIG. 6 shows in a flowchart how the energy threshold detection level is determined for a subsequent frame portion denoted as frame 1. In block 600, the energy threshold ($E_T(1)$) is a scaled portion of the energy value for the previous frame. A scaling value of 0.85 was experimentally determined to provide acceptable results in the CAS example. In block 602, a check is made to determine if the resulting energy threshold level is equal to a minimum value in block 602. If not, then the energy threshold level is set to the minimum value in block 604. The energy value for frame 1 (E(1)) is determined in another portion of signal processor 206.

Figure 7:
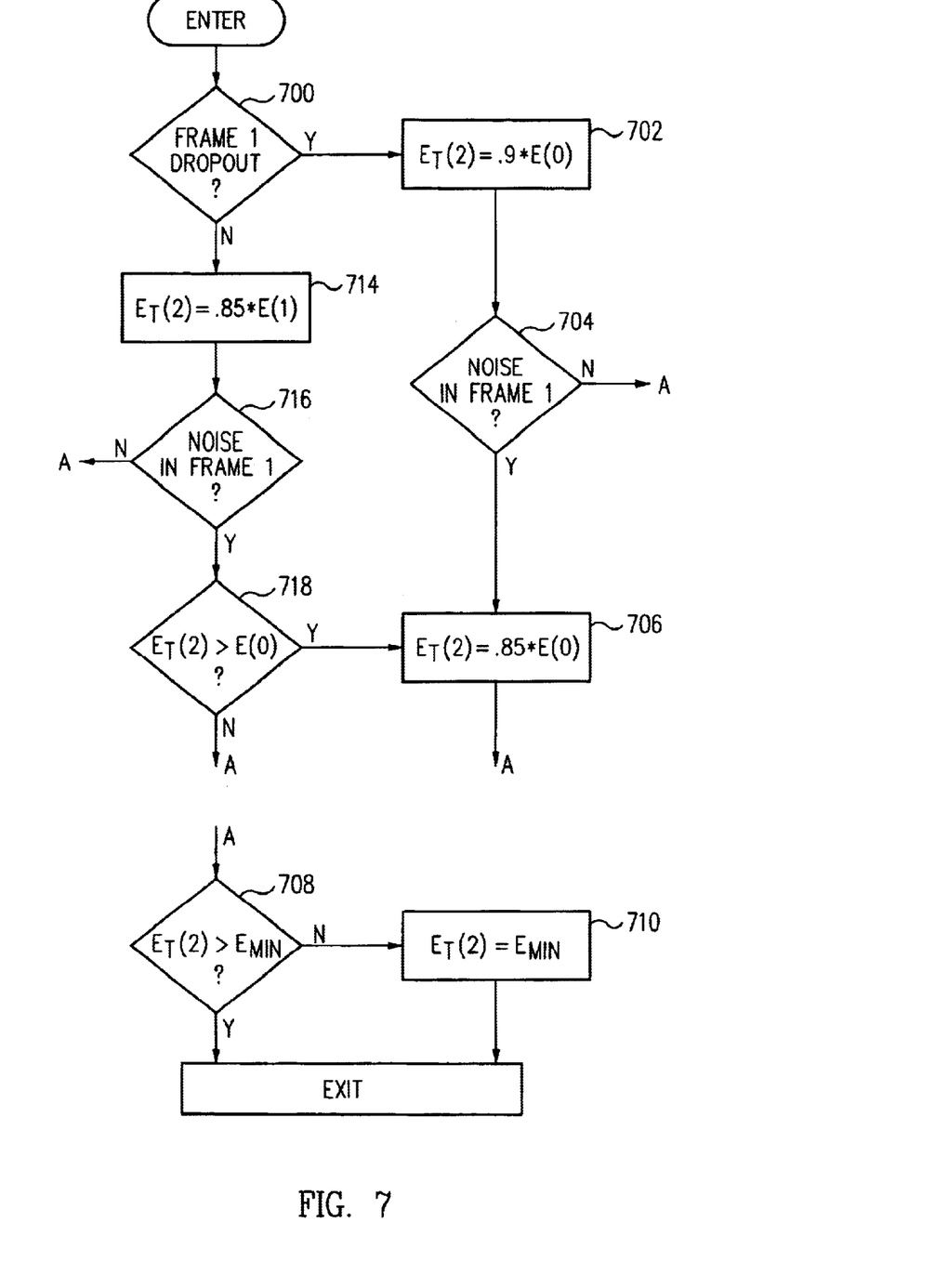
FIG. 7 is a flowchart diagram for determining a dynamic energy threshold for a third frame.

Block 700 in the FIG. 7 flowchart shows that the energy threshold level for frame 2 is at least partially based on whether an energy dropout occurred in frame 1. If a dropout in frame 1 occurred, a scaled portion of the energy from a previous frame, frame 0 in this case, is used to determine the energy threshold detection level ($E_T(2)$) as shown in block 702, i.e.

$$E_T(2)=0.9*E(0)=0.9*40 =36.$$

In block 704, a check for whether noise is present in frame 1 is made. If noise is present, a lesser portion of the energy from frame 0 is used to determine the energy threshold detection level for frame 2 as shown in block 706, i.e., $$E_T(2)=0.85*E(0)=0.85*40 =34.$$

At this point, whether speech is present in frame 1 or not, go to block 708 and check if the energy threshold detection level in frame 2 is greater than a minimum energy $E_{MIN}$. If not, set the energy threshold detection level in frame 2 to the minimum energy in block 710 and exit this portion of dynamic threshold determiner 216.

Going back to block 700, if there is no energy dropout in frame 1, use a scaled portion of the energy from frame 1 as shown in block 714 to determine the energy threshold detection level for frame 2, i.e.

$$E_T(2) = 0.85 * E(1) = 0.85 * 144 = 122.$$

Figure 8:
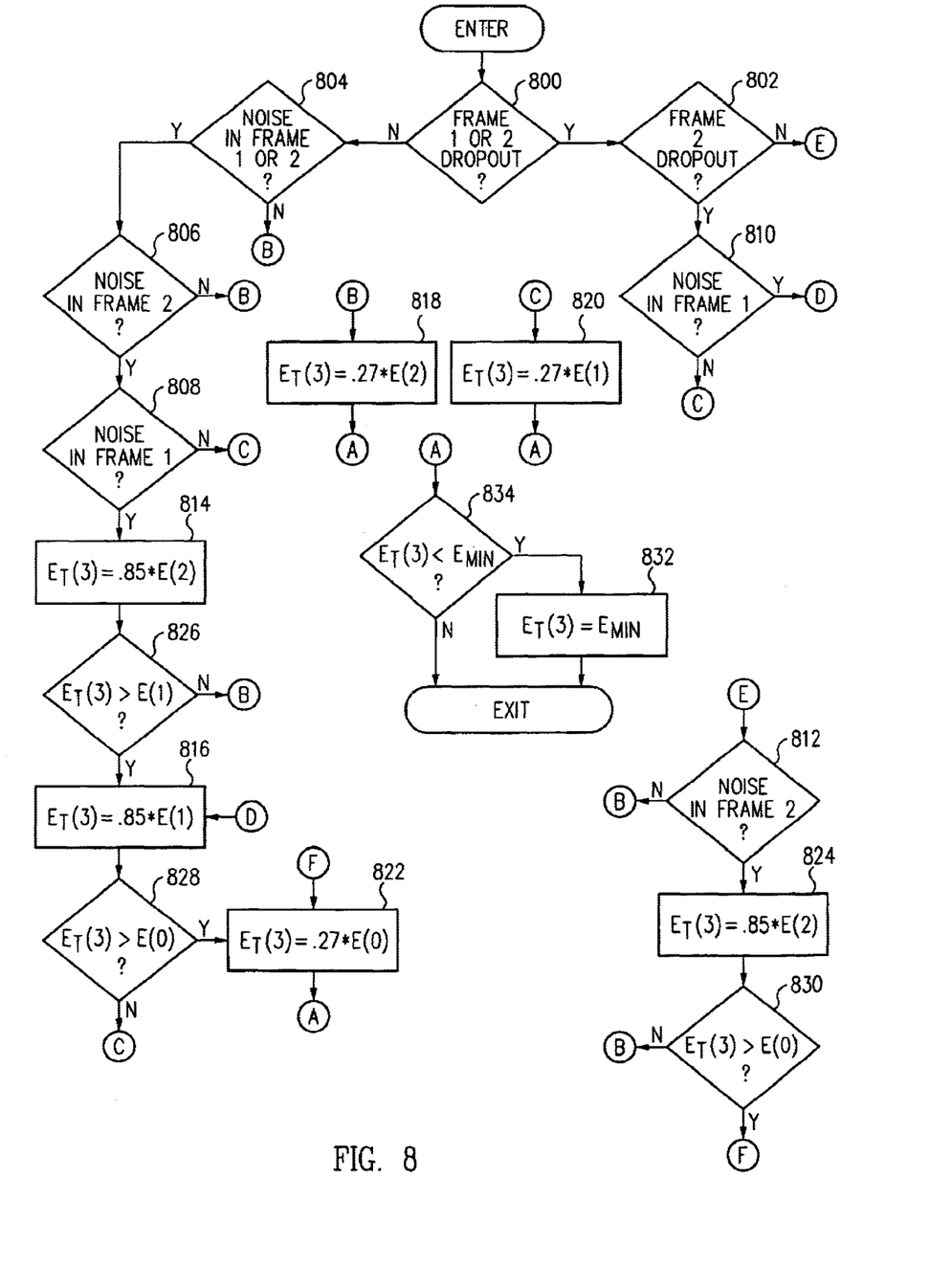
FIG. 8 is a flowchart diagram for determining a dynamic energy threshold for a fourth frame.

Next, in block 716, check if noise is present in frame 1. If noise is present, check if the energy threshold detection level in frame 2 is "in-range", i.e., the energy threshold detection level in frame 2 is greater than the energy in frame 0, as shown in block 718. If so, go to block 706 and set the energy threshold detection level in frame 2 equal to a scaled portion of the energy in frame 0. At this point, whether the energy threshold detection level for frame 2 is greater than the energy in frame 0 or not, and whether noise is present in frame 1 or not, go to block 708 and check if the energy threshold detection level in frame 2 is greater than the minimum energy. If not, set the energy threshold detection level in frame 2 to the minimum energy in block 710 and exit this portion of dynamic threshold determiner 216. FIG. 8 shows in a flowchart that the energy threshold detection level for frame 3, $E_T(3)$, is determined based on whether energy dropouts occurred in previous frames as shown in blocks 800 and 802, and whether noise was present in a particular frame, as shown in blocks 804, 806, 808, 810, and 812. Scaling coefficients multiply energy values from previous frames (E(0), E(1), E(2)) to determine energy threshold detection value $E_T(3)$ in blocks 814, 816, 818, 820, 822, and 824 in FIG. 8. The scaling coefficients are determined experimentally and may vary from the values shown in FIGS. 7 and 8, depending on the application and input signal conditions.

Once a tentative value for energy threshold detection value $E_T(3)$ is determined, it is compared to energy values from previous frames as shown in blocks 826, 828, and 830 to ensure that $E_T(3)$ is "in-range", since the energy value from a previous frame may have been affected by the presence of noise energy at the specific frequencies being monitored by the detector. The energy threshold detection value for frame 3, $E_T(3)$, is set to a minimum energy value ($E_{MIN}$) in block 832 if it is below the minimum value $E_{MIN}$ in block 834. The embodiment of the present invention for the CAS example allows only a single energy dropout during the four frames. Thus, in frame 3 of the CAS example, if a dropout occurs for any of the frequencies in more than one frame portion, the detection process fails. A different number of dropouts may be allowed, depending on the particular application utilizing the present invention, and the logic in FIGS. 7 and 8 changed accordingly to accommodate the increased number of dropouts allowed. When the number of frame portions processed is greater than four as shown for the CAS example, a greater number of tests are required to determine if noise is present, or if there are dropouts in a greater number of frame portions.

Due to the complexity of the decision chain for frames 2 and 3, a novel look-up table and decode technique may be utilized to replace the flow diagrams in FIGS. 7 and 8. This technique for dynamically determining thresholds generates an energy threshold for each frame portion based on a value of the energy signal for at least one tone by generating a data table including scaling coefficients and addresses of the energy values for at least one frame portion. The technique further generates a control word for the at least one frame portion including control flags that are set based on the energy values being below a threshold value in previous frame portions and the presence of noise in previous frame portions. An offset into the data table is determined based on the control word and a scaling coefficient and an address of an energy value are retrieved from the data table based on the offset. This technique is further described in copending U.S. patent application, Ser. No.: 09/160,417, Filed: Sep. 25, 1998, which is assigned to the same assignee as the present invention and is hereby incorporated by reference.

Table 5 summarizes the results of using the example frequencies in the present invention:

TABLE 5

| Frame # | 2130 Hz energy | 2130 next frame energy threshold | 2750 Hz energy | 2750 next frame energy threshold |
|---|---|---|---|---|
| 0 | 32 | 9 | 40 | 9 |
| 1 | 35 | 26 | 144 | 34 |
| 2 | 109 | 31 | 80 | 34 |
| 3 | 4 | 10 | 94 | 22 |

Comparing Tables 4 and 5, there is still a 2130 Hz tone energy dropout in frame 3 (4 is less than 10) but the 2750 Hz tone energy dropout in frame 2 is avoided (80 is greater than 34). Using the present invention, the rules for detection are relaxed when noise is present to allow a single energy dropout to occur during the four frame detection process, resulting in a successful CAS detection. When the present invention is utilized in other applications, the number of dropouts allowed may vary depending on the number of frames between which the energies of the tones are compared, i.e., a larger number of dropouts may be allowed when more frames are involved.

The present invention provides a robust method and apparatus for detecting tones in an input signal that may include noise components. The CAS example illustrated application of the present invention to a situation where a DTMF signal included a speech signal which would otherwise interfere with detection of the CAS tones. While the CAS example has been illustrated extensively herein, the present method and apparatus may be applied to detectors receiving MTMF signals having more than two tones to be detected, one or more noise signals, and tones having different frequencies and durations than the CAS tones. Dynamic determination of energy threshold detection levels are performed individually for all of the tones to be detected in the input signal. The scaling values used in the CAS example may vary for other applications according to the input signals and performance of the system to which the present invention is applied. The components for the present invention for signal tone detector 100 may be implemented in hardware, software, firmware, or a combination of hardware, software and firmware. A known data processor, such as a computer, as well as other hardware, firmware, and software devices, may be used to implement the present invention. Writing of suitable code for a processor, as well as constructing suitable circuitry, is well within the skill of one skilled in the art in light of this disclosure.

While the invention has been described with respect to the embodiments and variations set forth above, these embodiments and variations are illustrative and the invention is not to be limited in scope to these embodiments and variations. Accordingly, various other embodiments and modifications and improvements not described herein may be within the spirit and scope of the present invention, as defined by the following claims.

What is claimed is:

1. A dual-tone multi-frequency (DTMF) detector for detecting at least one tone having a known frequency and duration in an input signal, the input signal being input over a period of time, the period of time being divided into frame portions including at least an initial frame portion and a last frame portion, the apparatus comprising:

means for generating an energy signal indicative of the energy of the input signal during each frame portion;

a signal filter receiving the energy signal and generating a noise indicator based on the energy signal;

a dynamic threshold determiner generating an energy threshold for each frame portion based on a value of the energy signal during a previous frame portion; and a signal processor receiving the energy threshold, the noise indicator, and the energy signal, and determining when the input signal includes the at least one tone based on the energy threshold, the noise indicator, and the energy signal.

2. The DTMF detector, as recited in claim 1, wherein the energy threshold for the initial frame portion is based on a minimum expected value of the energy signal for a subsequent frame portion, and the energy thresholds for frame portions subsequent to the initial frame portion are based on values of the energy signals during previous frame portions and whether noise is detected in the input signal.

3. The DTMF detector, as recited in claim 1, wherein the signal is input in the time domain and the means for generating the energy signal comprises a discrete Fourier transform.

4. The DTMF detector, as recited in claim 3, wherein the discrete Fourier transform is the Goertzel algorithm.

5. The DTMF detector, as recited in claim 1, wherein the signal filter generates a remaining portion of the energy signal by separating a portion of the energy signal associated with the at least one tone from the energy signal, and sets the noise indicator based on the remaining portion of the input energy signal being above a noise threshold.

6. The DTMF detector, as recited in claim 5, wherein the signal filter includes a low pass filter for separating the portion of the energy signal associated with the at least one tone from the remaining portion of the energy signal.

7. The DTMF detector, as recited in claim 6, wherein the signal filter further includes a signal averaging filter for determining an average value of the remaining portion of the energy signal.

8. The DTMF detector, as recited in claim 7, wherein the signal filter further includes a peak detector for determining the maximum average value.

9. The DTMF detector, as recited in claim 1, wherein the signal processor compares the energy levels for the at least one tone between at least two frame portions.

10. The DTMF detector, as recited in claim 9, wherein the signal processor allows a drop in energy level in one frame portion.

11. The DTMF detector, as recited in claim 9, wherein the signal processor determines when the energy levels of the at least one tone between the at least two frames are within a predetermined range.

12. The DTMF detector, as recited in claim 9, wherein the signal processor normalizes the energy levels between the at least two frames based on the number of samples in each of the at least two frames before comparing the energy levels.

13. An apparatus for detecting at least one tone having a known frequency and duration in an input signal, the input signal being input over a period of time, the period of time being divided into frame portions including at least an initial frame portion and a last frame portion, the apparatus comprising:

means for generating an energy signal indicative of the energy of the input signal during each frame portion;

a signal filter receiving the energy signal and generating a noise indicator based on the energy signal;

a dynamic threshold determiner generating an energy threshold for each frame portion based on a value of the energy signal during a previous frame portion; and a signal processor receiving the energy threshold, the noise indicator, and the energy signal, and determining when the input signal includes the at least one tone based on the energy threshold, the noise indicator, and the energy signal.

* * * * *

UNITED STATES PATENT AND TRADEMARK OFFICE
CERTIFICATE OF CORRECTION

PATENT NO. : 6,711,540 B1
DATED : March 23, 2004
INVENTOR(S) : John G. Bartkowiak It is certified that error appears in the above-identified patent and that said Letters Patent is hereby corrected as shown below:

Column 8,
Line 35, replace the second occurrence of "27" in Table 2 with -- 10 --.

Signed and Sealed this

Twenty-ninth Day of June, 2004

JON W. DUDAS
*Acting Director of the United States Patent and Trademark Office*